United States Patent
Suzuki et al.

(10) Patent No.: US 10,422,626 B2
(45) Date of Patent: Sep. 24, 2019

(54) POSITION MEASURING APPARATUS, POSITION MEASURING METHOD, AND NON-TRANSITORY COMPUTER READABLE RECORDING MEDIUM

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/841,919

(22) Filed: Dec. 14, 2017

(65) Prior Publication Data

US 2018/0106594 A1    Apr. 19, 2018

Related U.S. Application Data

(63) Continuation of application No. PCT/JP2015/068080, filed on Jun. 23, 2015.

(51) Int. Cl.
G01B 11/02 (2006.01)
G01B 11/00 (2006.01)
(Continued)

(52) U.S. Cl.
CPC ............ *G01B 11/002* (2013.01); *G01B 11/02* (2013.01); *G01S 5/16* (2013.01); *H04B 10/114* (2013.01);
(Continued)

(58) Field of Classification Search
CPC .......... G01N 33/54346; G01N 33/552; G01N 33/574; G01N 33/582; G01N 33/587;
(Continued)

(56) References Cited

U.S. PATENT DOCUMENTS

2010/0176939 A1\*  7/2010  Harres ............... H04B 10/1149
                                                        340/539.1
2012/0154443 A1   6/2012  Matsui et al.
(Continued)

FOREIGN PATENT DOCUMENTS

JP    2000-55657    2/2000
JP    2007-164506   6/2007
(Continued)

OTHER PUBLICATIONS

International Search Report dated Sep. 1, 2015 in corresponding International Patent Application No. PCT/JP2015/068080.
(Continued)

*Primary Examiner* — Michael P Stafira
(74) *Attorney, Agent, or Firm* — Staas & Halsey LLP (57) ABSTRACT

A position measuring apparatus instructs a first node to emit light by transmitting a first light emission pattern to the first node, instructs a second node to emit light by transmitting the first light emission pattern to the second node, when light emission following the instructed first light emission pattern is detected, and instructs the second node to emit light by transmitting a second light emission pattern that is different from the first light emission pattern, when light emission following the instructed first light emission pattern is not detected.

6 Claims, 9 Drawing Sheets

(51) Int. Cl.
*H04W 4/38* (2018.01)
*H04W 4/029* (2018.01)
*H04B 10/112* (2013.01)
*H04B 10/114* (2013.01)
*G01S 5/16* (2006.01)

(52) U.S. Cl.
CPC ..... *H04B 10/1121* (2013.01); *H04B 10/1129* (2013.01); *H04B 10/1149* (2013.01); *H04W 4/029* (2018.02); *H04W 4/38* (2018.02)

(58) Field of Classification Search
CPC .......... G01N 33/60; G02B 6/4292; G02B 2006/12138; G02B 23/00; G02B 6/12019; G02B 6/12033; G02B 6/1225; G02B 6/26; G02B 6/28; G02B 6/4298; G02B 2027/0138; G02B 2027/014; G02B 2027/0187; G02B 27/0093; G02B 23/2469; G02B 23/26; G02B 26/103; G02B 27/017; G02B 27/0172; G02B 19/0028; G02B 19/0066; G02B 2027/0127; G02B 27/0075; G02B 27/0101; G02B 6/3566; G02B 6/3578; H04W 64/003; H04W 16/14; H04W 16/26; H04W 28/16; H04W 36/12; H04W 40/02; H04W 40/04; H04W 40/20; H04W 40/246; H04W 4/24; H04W 64/00; H04W 72/02; H04W 72/0413; H04W 72/0453; H04W 72/046; H04W 72/085; H04W 84/005; H04W 84/045; H04W 84/105; H04W 84/18; H04W 84/22; H04W 88/085; H04W 92/06; H04W 4/70; H04W 52/0229; H04W 24/00; H04W 24/02; H04W 28/06; H04W 40/10; H04W 4/80; H04W 52/0219; H04W 88/16; H04W 8/00; H04W 92/02; H04W 4/029; H04W 4/38; H04W 84/12; H04W 16/225; H04W 24/08; H04W 24/10; H04W 48/10; H04W 48/16; H04W 48/20; H04W 4/02; H04W 4/04; H04W 4/043; H04W 52/0216; H04W 52/0235; H04W 52/0274; H04W 68/005; H04W 76/15; H04W 76/27; H04W 8/005; G01J 3/28; G01J 1/0403; G01J 1/0425; G01J 1/42; G01J 2003/1269; G01J 2003/2826; G01J 3/0229; G01J 3/1256; G01J 3/2823; G01S 5/16; G01S 17/89; G01S 7/4817; G01S 13/878; G01S 15/08; G01S 15/42; G01S 17/023; G01S 17/026; G01S 17/08; G01S 17/42; G01S 17/93; G01S 1/70; G01S 2013/468; G01S 7/4808; G01S 7/4811; G01S 7/4813; G01S 7/4865; G01B 11/24; G01B 11/00; G01B 11/002; G01B 11/02; G01B 11/026; G01B 11/25; G01B 11/26; G01B 15/00; G01B 2210/54
See application file for complete search history.

(56) References Cited

U.S. PATENT DOCUMENTS

2012/0281980 A1* 11/2012 Cho ............... G01D 5/268
398/28
2016/0127039 A1* 5/2016 Guo ............... H04B 10/5561
398/115
2016/0226573 A1* 8/2016 Behroozi ........... H04B 7/18504

FOREIGN PATENT DOCUMENTS

JP 2007-170848 7/2007
JP 2011-188378 9/2011
WO WO 2012/023253 A1 2/2012

OTHER PUBLICATIONS

Written Opinion of the International Searching Authority dated Sep. 1, 2015 in corresponding International Patent Application No. PCT/JP2015/068080.

* cited by examiner

| NODE ID | LIGHT EMISSION PATTERN 141 ||
| --- | --- | --- |
| | COUNT | INTERVAL |
| NODE 10a | 3 | 2 |

FIG.5

| NODE ID | LIGHT EMISSION PATTERN 142 ||
| --- | --- | --- |
| | COUNT | INTERVAL |
| NODE 10e | 2 | 1 |
| NODE 10f | 2 | 2 |
| ... | ... | ... |

FIG.6

| NODE ID | COORDINATES 143 |
| --- | --- |
| NODE 10g | xg, yg, zg |
| NODE 10i | xi, yi, zi |
| ... | ... |

FIG.7

| NODE ID |
|---|
| NODE 10b |
| NODE 10c |
| ... |

| LIGHT EMISSION PATTERN ||
|---|---|
| COUNT | INTERVAL |
| 2 | 3 |
| 3 | 3 |
| ... | ... |

POSITION MEASURING APPARATUS, POSITION MEASURING METHOD, AND NON-TRANSITORY COMPUTER READABLE RECORDING MEDIUM

CROSS-REFERENCE TO RELATED APPLICATION

This application is a continuation of International Application No. PCT/JP2015/068080, filed on Jun. 23, 2015, the entire contents of which are incorporated herein by reference.

FIELD

The embodiment discussed herein is related to a position measuring apparatus and the like.

BACKGROUND

Conventionally, there has been a technology for collecting measurement data by deploying a large number of nodes with a sensor across a large area of the ground, such as a plain, a slope, or a field, or in a large building, for example, and by connecting the nodes over a multi-hopping network. Such a multi-hopping network enables nodes that are remotely located to communicate with one another by allowing a node to communicate with a nearby node via a short distance wireless communication, and to transfer packets one after another. In the explanation hereunder, a network for collecting measurement data from such nodes over a multi-hopping network is referred to as a wireless sensor network (WSN).

To measure the position of a node in a WSN, there has been a conventional technology 1 for providing a node with a global positioning system (GPS). There has been another conventional technology 2 in which the position of a node is measured by conducting a land survey and recording the position at the time of installation of the node, provided that the node will be kept unmoved. There has been another conventional technology 3 for identifying the position of a node at an unknown position based on the principle of triangulation, by measuring the distance from each of a plurality of nodes at known positions to the node based on a radio field strength.

The conventional technology 1 has a disadvantage that the cost of a node is increased, and the conventional technology 2 has a disadvantage that the installation cost is increased. Especially when the number of nodes is increased, the costs of the nodes and the installation costs are increased proportionally.

With the conventional technology 3, the node of which position can be identified is limited to a node at a short distance with respect to the node at the known position, because this technology uses a short distance wireless communication. It is still possible to measure the positions of nodes in a wide area by repeating this process based on the node at the position having been identified. However, as a node is located further, the error accumulates more. Therefore, it is difficult to identify the position of a large number of nodes accurately.

As an exemplary technology addressing the disadvantages in the conventional technologies 1 to 3, a conventional technology 4 has been available. The conventional technology 4 measures the position of a node by issuing an instruction for emitting light to the node, and detecting a light-emitting point with a camera. With the conventional technology 4, the cost of a node is increased because a light-emitting component is installed in the node, but the cost can be suppressed by using a light emitting diode (LED) which is a general-purpose component, as the light-emitting component. As another technology using an LED, there has been a conventional technology 5 that notifies the identification information on a light-emitting node via an optical communication, using on and off of the light. A related art examples are disclosed in International Publication Pamphlet No. WO 2012/023253, Japanese Laid-open Patent Publication No. 2000-55657, and Japanese Laid-open Patent Publication No. 2007-170848.

However, the conventional technology has a disadvantage about measuring the position of a node using a multi-hopping communication.

The conventional technology 4 is characterized in that the time at which and the order in which packets arrive at a destination node cannot be guaranteed because the packets are sent to a destination node by causing intermediary nodes to transfer the packets to the destination node. Let us assume herein an example in which a light-emitting instruction is transmitted to a node A, but no emission of light is acknowledged after some waiting time, so that another light-emitting instruction is transmitted to a next node B. In such a case, it is impossible to measure the positions of the nodes A and B even if an emission of light is acknowledged, because it is unknown which one of the node A and the node B has emitted the light first.

The conventional technology 5 enables a mapping relation between a light-emitting point and a node to be maintained, even when the order at which the nodes emit light changes, by transmitting the identification information on a node with an on-and-off pattern of light. However, because an LED is a light source with a low luminance and no directivity, the identification information on a node can only be received at a short distance. In order to observe the light emissions across a much wider area that is assumed with a WSN at once, the camera needs to be placed distantly to observe the light emissions. Therefore, it will be difficult to use an LED in the transmission of identification information on the node, thereby making it impossible to measure the position of a node. When the use of an LED is assumed, a lower bit rate may also be used, but a lower bit rate will disadvantageously require a longer time to complete a transmission of information.

According to one aspect, an object of the present invention is to provide a position measuring apparatus, a position measuring method, and a position measuring program capable of measuring the position of a node.

According to a first aspect, a position measuring apparatus includes a control unit. The control unit instructs a first node that is included in a plurality of nodes to emit light by transmitting a light emission pattern to the first node. When light emission following the instructed light emission pattern is detected, the control unit stores information on a position at which the light emission is detected and information on the first node in a storage unit in a manner mapped to each other. When the light emission following the instructed light emission pattern is not detected, the control unit instructs a second node that is different from the first node to emit light by transmitting a light emission pattern that is different from the light emission pattern instructed to the first node, to the second node.

SUMMARY

According to an aspect of an embodiment, a position measuring apparatus includes a memory; and a processor that executes a process including: first instructing a first node included in a plurality of nodes to emit light by transmitting a first light emission pattern to the first node; storing information on a position at which the light emission is detected and information on the first node in the memory in a manner mapped to each other, when light emission following the instructed first light emission pattern is detected; second instructing a second node that is different from the first node to emit light by transmitting the first light emission pattern to the second node, when light emission following the instructed first light emission pattern is detected; and third instructing the second node to emit light by transmitting a second light emission pattern that is different from the first light emission pattern, when light emission following the instructed first light emission pattern is not detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. These embodiments are, however, not intended to limit the scope of the present invention in any way.

[a] First Embodiment

Figure 1:
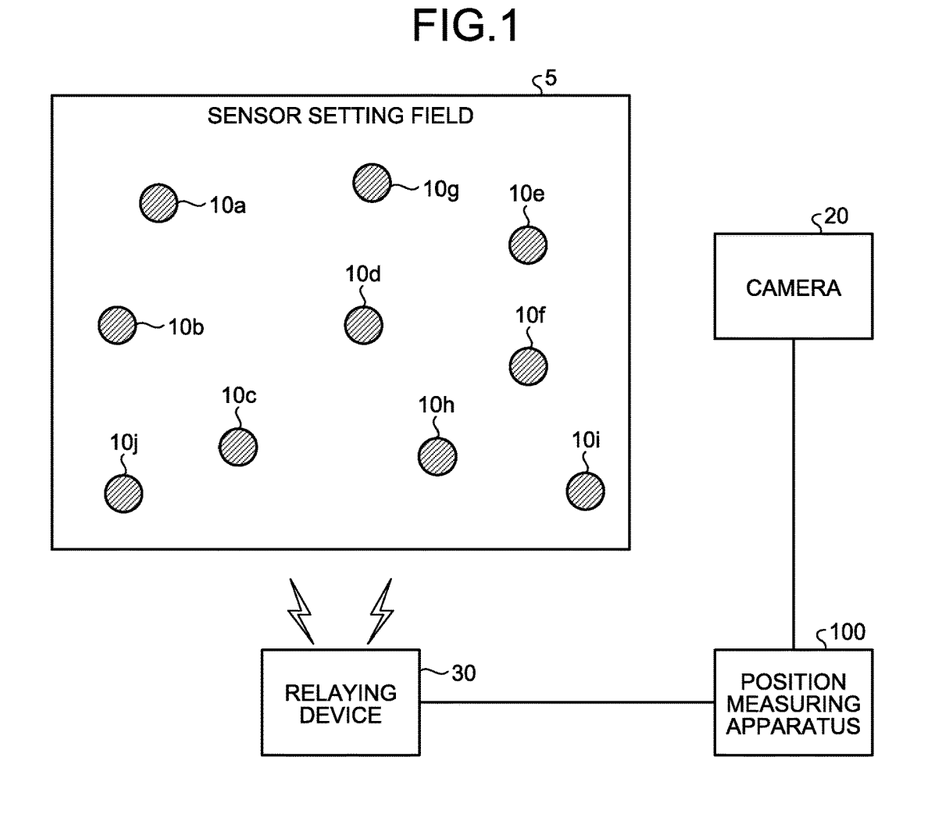
FIG. 1 is a schematic illustrating a configuration of a position measuring system according to an embodiment of the present invention.

An exemplary position measuring system according to one embodiment of the present invention will now be explained. FIG. 1 is a schematic illustrating a configuration of a position measuring system according to the embodiment. As illustrated in FIG. 1, this position measuring system includes nodes 10a, 10b, 10c, 10d, 10e, 10f, 10g, 10h, 10i, and 10j in a sensor setting field 5. Any other nodes may also be installed in the sensor setting field 5. The nodes 10a to 10j are collectively referred to as nodes 10, as appropriate. The position measuring system also includes a camera 20, a relaying device 30, and a position measuring apparatus 100.

The node 10 is charged using an energy harvesting device, for example, and is caused to transmit measurement results of sensors and other information wirelessly, by being triggered by a wireless reception from another node 10, or triggered by a response or the like of a sensor connected to the node 10. The node 10 exchanges data with the position measuring apparatus 100 via a multi-hopping communication routed over the other nodes 10.

For example, data that is transmitted by the node 10a and is addressed to the position measuring apparatus 100 is routed over the nodes 10b and 10c, and the relaying device 30, and reaches the position measuring apparatus 100. Data addressed to the node 10a and transmitted by the position measuring apparatus 100 is routed over the relaying device 30, the nodes 10c and 10b, and reaches the node 10a.

The node 10 has an LED, and, upon receiving light-emitting instruction information addressed to the node 10 from the position measuring apparatus 100, the node 10 causes the LED to emit light based on a light emission pattern included in the light-emitting instruction information.

The camera 20 is installed at a location where a bird's-eye view of the entire nodes 10 installed in the sensor setting field 5 can be obtained, and is a camera for capturing an image of the target area. The camera is connected to the position measuring apparatus 100 over the wire or wirelessly, and transmits information on the captured image to the position measuring apparatus 100. In the explanation hereunder, the information on an image captured by the camera 20 will be referred to as image information.

The relaying device 30 is a device that relays data communication performed between the nodes 10 and the position measuring apparatus 100. For example, the relaying device 30 is connected to the position measuring apparatus 100 over the wire or wirelessly. The relaying device 30 is connected to the nodes 10 wirelessly.

The position measuring apparatus 100 transmits light-emitting instruction information including some light emission pattern to a node 10 of which position is to be measured, and measures the position of the node by detecting some light emission pattern in the image information received from the camera 20. If the position measuring apparatus 100 cannot detect a light emission pattern within a predetermined time from when the light-emitting instruction information has been transmitted, the position measuring apparatus 100 transmits light-emitting instruction information including a light emission pattern that is different from the previous one to a next node 10, and measures the position of the next node 10.

If the position measuring apparatus 100 cannot recognize the light emission pattern instructed to the previous node 10, the position measuring apparatus 100 measures the position of a next node by giving an instruction of a light emission pattern that is different from the previous one, to the next node. Therefore, the position measuring apparatus 100 can measure the position of the node 10 by mapping the light emission position of the light emission pattern to the node.

Figure 2:
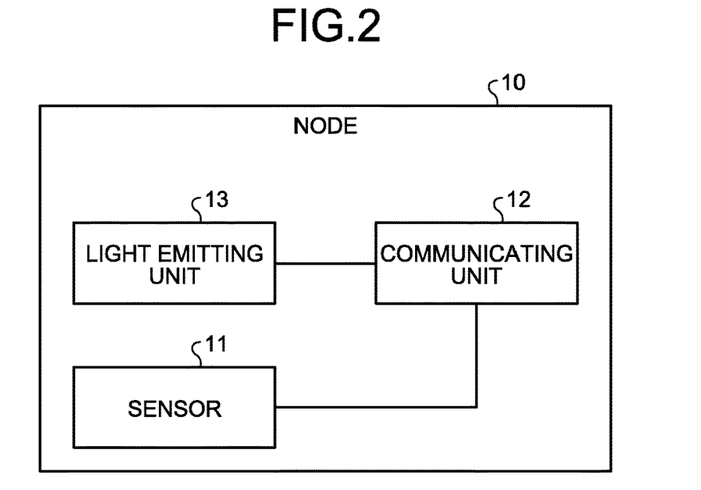
FIG. 2 is a functional block diagram illustrating a configuration of a node.

An exemplary configuration of the node 10 illustrated in FIG. 1 will now be explained. FIG. 2 is a functional block diagram illustrating a configuration of the node. As illustrated in FIG. 2, the node 10 includes a sensor 11, a communicating unit 12, and a light emitting unit 13.

The sensor 11 is a sensor that collects various types of measurement data. For example, the sensor 11 makes a measurement such as temperature, humidity, water content of the ground, acceleration, as the measurement data. The sensor 11 outputs the measurement data to the communicating unit 12.

The communicating unit 12 is a processing unit that communicates data with the other nodes and the position measuring apparatus 100 over the multi-hopping wireless communication. For example, the communicating unit 12 receives light-emitting instruction information addressed to the node 10 having that communicating unit 12, and outputs the light-emitting instruction information to the light emitting unit 13. When the communicating unit 12 receives light-emitting instruction information addressed to another node 10, the communicating unit 12 transfers the light-emitting instruction information to an adjacent node 10 leading to the other node 10, by referring to a route table.

When the communicating unit 12 acquires measurement data from the sensor 11, the communicating unit 12 transmits the measurement data to the position measuring apparatus 100.

The light emitting unit 13 is a processing unit that causes the LED to emit light following a light emission pattern included in the light-emitting instruction information. The light emission pattern includes a count and an interval. For example, when the light emission pattern specifies a "count N" and an "interval M", the light emitting unit 13 repeats, for a predetermined number of times, a process of causing the LED to emit light N times successively, pausing for the time corresponding to the interval M, and causing the LED to emit light N times successively.

Figure 3:
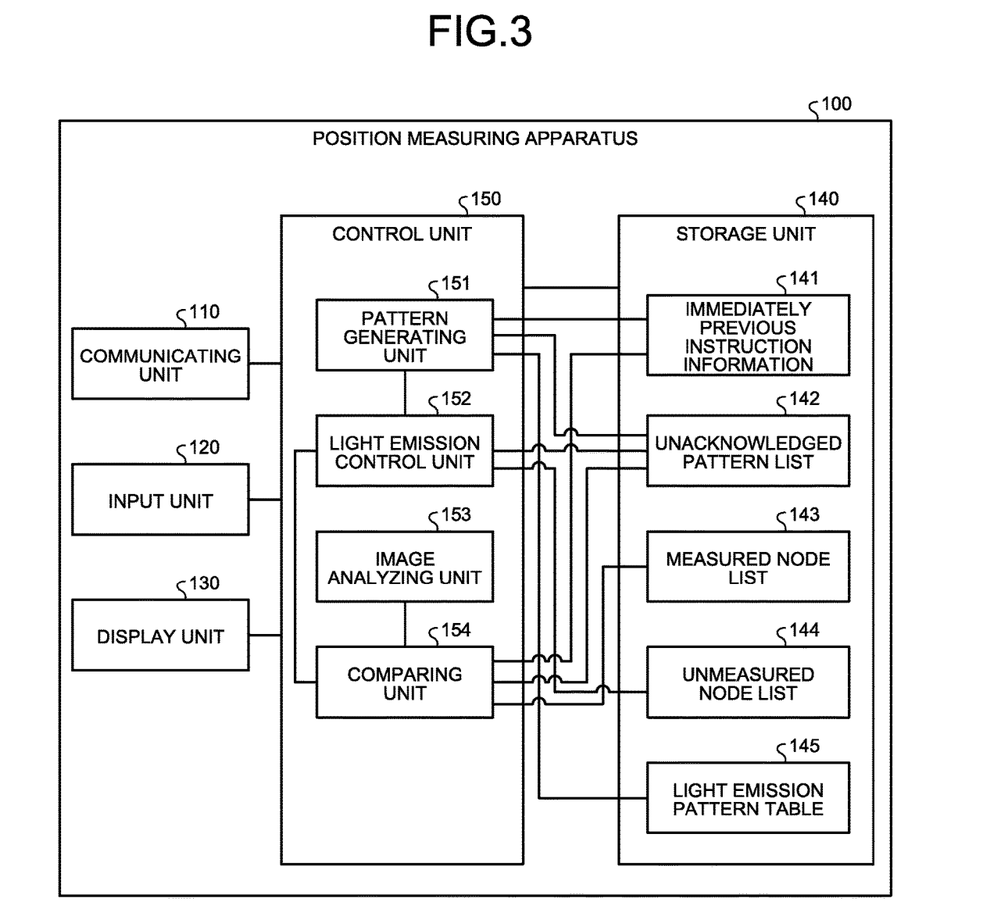
FIG. 3 is a functional block diagram illustrating a configuration of a position measuring apparatus.

An exemplary configuration of the position measuring apparatus 100 illustrated in FIG. 1 will now be explained. FIG. 3 is a functional block diagram illustrating a configuration of a position measuring apparatus. As illustrated in FIG. 3, the position measuring apparatus 100 includes a communicating unit 110, an input unit 120, a display unit 130, a storage unit 140, and a control unit 150.

The communicating unit 110 is a communication device that communicates with the nodes 10 via the relaying device 30. The communicating unit 110 also communicates data with the camera 20, and acquires image information. The control unit 150 described later exchange data with the nodes 10 via the communicating unit 110. The control unit 150 acquires the image information from the camera 20 via the communicating unit 110.

The input unit 120 is an input device for inputting various types of information to the position measuring apparatus 100. The input unit 120 corresponds to an input device such as a keyboard, a mouse, and a touch panel.

The display unit 130 is a display device that displays information output from the control unit 150. The display unit 130 corresponds to a display or a touch panel, for example.

The storage unit 140 includes an immediately previous instruction information 141, an unacknowledged pattern list 142, a measured node list 143, an unmeasured node list 144, and a light emission pattern table 145. For example, the storage unit 140 corresponds to a storage device such as a random access memory (RAM), a read-only memory (ROM), or a semiconductor memory device such as a flash memory.

Figure 4:
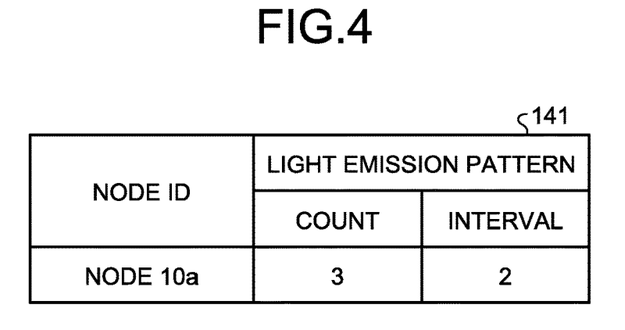
FIG. 4 is a schematic illustrating an exemplary data structure of immediately previous instruction information.

The immediately previous instruction information 141 is information indicating a light emission pattern having been immediately previously instructed to a node 10 by the position measuring apparatus 100. FIG. 4 is a schematic illustrating an exemplary data structure of immediately previous instruction information. As illustrated in FIG. 4, the immediately previous instruction information 141 includes a node ID and a light emission pattern. The node ID is information for uniquely identifying the node to which the emission of light following a light emission pattern has been instructed. The light emission pattern is a light emission pattern instructed to the corresponding node, and includes a count and an interval.

For example, the example illustrated in FIG. 4 specifies that the destination to which the position measuring apparatus 100 has immediately previously transmitted light-emitting instruction information is the node 10a, and the light emission pattern included in the light-emitting instruction information has a count of "3" and an interval of "2". The immediately previous instruction information 141 is updated every time the position measuring apparatus 100 transmits light-emitting instruction information.

Figure 5:
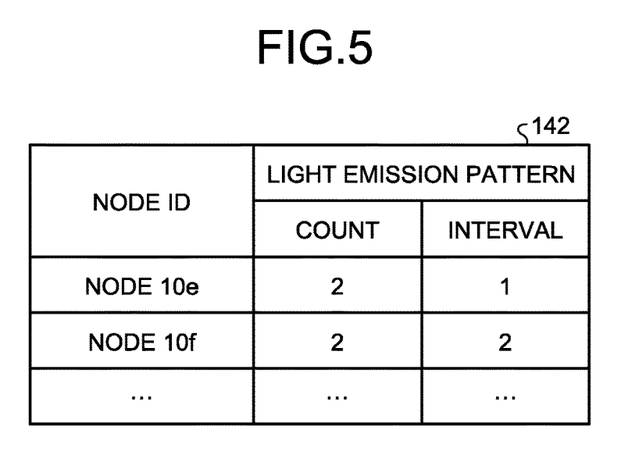
FIG. 5 is a schematic illustrating an exemplary data structure of an unacknowledged pattern list.

The unacknowledged pattern list 142 is a list for retaining a light emission pattern in which an emission of light has been instructed to a node 10, but has not been acknowledged. FIG. 5 is a schematic illustrating an exemplary data structure of the unacknowledged pattern list. As illustrated in FIG. 5, this unacknowledged pattern list 142 includes a node ID and a light emission pattern. The node ID is information for uniquely identifying the node of which emission of light following the instructed light emission pattern has not been acknowledged yet. The light emission pattern specifies a light emission pattern in which the light emission has not been acknowledged.

For example, the first entry in FIG. 5 is registered with a node ID "node 10e", a count "2", and an interval "1", and therefore, indicates that the light emission pattern with a count "2" and an interval "1" has been instructed to the node 10e, but the light emission has not been acknowledged yet.

Figure 6:
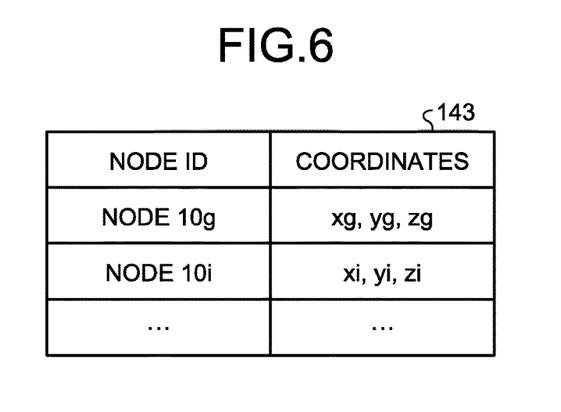
FIG. 6 is a schematic illustrating an exemplary data structure of a measured node list.

The measured node list 143 is a list that retains information on a node of which position has been identified. FIG. 6 is a schematic illustrating an exemplary data structure of the measured node list. As illustrated in FIG. 6, this measured node list 143 includes a node ID and coordinates. The node ID is information for uniquely identifying the node of which position has been identified. The coordinates indicate the coordinates of the node.

Figure 7:
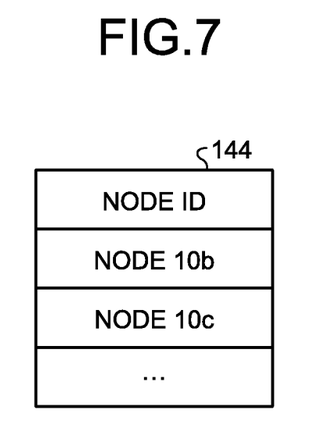
FIG. 7 is a schematic illustrating an exemplary data structure of an unmeasured node list.

The unmeasured node list 144 is a table that retains the node ID of a node of which position is to be measured. FIG. 7 is a schematic illustrating an exemplary data structure of the unmeasured node list. As illustrated in FIG. 7, the unmeasured node list 144 has a node ID for uniquely identifying a node of which position is to be measured.

Figure 8:
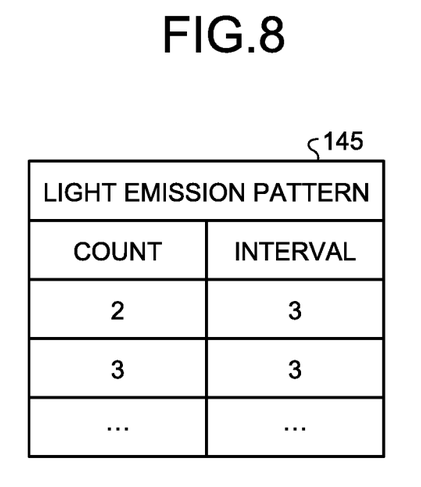
FIG. 8 is a schematic illustrating an exemplary data structure of a light emission pattern table.

The light emission pattern table 145 is a table that retains a plurality of light emission patterns. FIG. 8 is a schematic illustrating an exemplary data structure of the light emission pattern table. As illustrated in FIG. 8, this light emission pattern table 145 includes a plurality of light emission patterns.

The control unit 150 includes a pattern generating unit 151, a light emission control unit 152, an image analyzing unit 153, and a comparing unit 154. The control unit 150 is an example of a position measuring unit. The control unit 150 corresponds to an integrated device such as an application specific integrated circuit (ASIC) or a field programmable gate array (FPGA). The control unit 150 also corresponds to an electronic circuit such as a central processing unit (CPU) or a micro-processing unit (MPU).

The pattern generating unit 151 is a processing unit that acquires a light emission pattern from the light emission pattern table 145 that is different from the light emission pattern that has been instructed to a node 10 but in which an emission of light has not been acknowledged yet, and outputs the acquired light emission pattern to the light emission control unit 152.

For example, the pattern generating unit 151 acquires a light emission pattern not having been selected yet from those included in the light emission pattern table 145, and determines whether the acquired light emission pattern does not match the light emission pattern stored in the immediately previous instruction information 141, and whether the acquired light emission pattern matches any of the light emission patterns included in the unacknowledged pattern list 142. If the light emission pattern does not match the light emission pattern stored in the immediately previous instruction information 141, and does not match any one of the light emission patterns in the unacknowledged pattern list, the pattern generating unit 151 outputs the acquired light emission pattern to the light emission control unit 152.

If the light emission pattern matches any one of the light emission pattern stored in the immediately previous instruction information 141 or the light emission pattern stored in the unacknowledged pattern list, the pattern generating unit 151 acquires another light emission pattern that is different from the light emission pattern having been acquired, from the light emission pattern table 145. The pattern generating unit 151 repeats the process described above for the acquired light emission pattern.

If the immediately previous instruction information 141 is kept blank with the information on the node ID and the light emission pattern having been deleted therefrom, the pattern generating unit 151 determines that the acquired light emission pattern does not match the light emission pattern stored in the immediately previous instruction information 141.

If the light emission pattern table 145 does not have any light emission pattern that is different from those in the immediately previous instruction information 141 and the unacknowledged pattern list, the pattern generating unit 151 notifies the user of an error. For example, the pattern generating unit 151 may display the error on the display unit 130, or transmit a notification of the error to a terminal device, not illustrated, of the user.

The light emission control unit 152 is a processing unit that selects a node ID not having been selected yet from the unmeasured node list 144, and transmits light-emitting instruction information to the node 10 with the selected node ID, as the destination. The light emission control unit 152 stores the light emission pattern acquired from the pattern generating unit 151 in the light-emitting instruction information. When the light emission control unit 152 transmits the light-emitting instruction information, the light emission control unit 152 also updates the node ID and the light emission pattern included in the immediately previous instruction information 141, with the node ID of the destination node and the light emission pattern set to the light-emitting instruction information.

If the light emission control unit 152 receives a notification indicating that light emission has been acknowledged from the comparing unit 154, which is described later, within a predetermined time from when the light emission control unit 152 has transmitted light-emitting instruction information, the light emission control unit 152 selects another node ID not having been selected from the unmeasured node list 144, and repeats the process described above.

If the light emission control unit 152 does not receive any notification indicating that the light emission has been acknowledged, from the comparing unit 154 described later, within the predetermined time from when the light emission control unit 152 has transmitted light-emitting instruction information, the light emission control unit 152 stores the node ID and the light emission pattern having been stored in the immediately previous instruction information 141, in the unacknowledged pattern list 142.

The image analyzing unit 153 is a processing unit that acquires image information captured by the camera 20, and analyzes the acquired image information to detect a light emission pattern. For example, the image analyzing unit 153 compares the previous and following frames included in the image information, and detects a position at which the luminance changes by an amount equal to or more than a threshold, as a light-emitting position. The image analyzing unit 153 also focuses on the light-emitting position, and identifies a light-emission count and a light-emission interval based on the frames in the subsequent image information. The image analyzing unit 153 outputs the information on the identified light-emission count and light-emission interval and information on the light-emitting position, to the comparing unit 154. In the explanation hereunder, the information on the light-emission count and the light-emission interval identified by the image analyzing unit 153 is referred to as a detected pattern, as appropriate. The image analyzing unit 153 outputs the information on the detected pattern and the information on the light-emitting position to the comparing unit 154.

The comparing unit 154 compares the detected pattern with the light emission pattern stored in the immediately previous instruction information 141, and determines whether the patterns match. If the detected pattern matches the light emission pattern stored in the immediately previous instruction information 141, the comparing unit 154 registers the node ID stored in the immediately previous instruction information 141 and the light-emitting position, to the unmeasured node list 144 in a manner mapped to each other. The comparing unit 154 also notifies the light emission control unit 152 of the information indicating that the light emission has been acknowledged.

If the detected pattern does not match the light emission pattern stored in the immediately previous instruction information 141, the comparing unit 154 determines whether any of the light emission patterns stored in the unacknowledged pattern list matches the detected pattern. If the detected pattern matches the light emission pattern stored in the immediately previous instruction information 141, the comparing unit 154 registers the node ID corresponding to the matching light emission pattern and the light-emitting position to the measured node list 143 in a manner mapped to each other. If the detected pattern matches the light emission pattern stored in the immediately previous instruction information 141, the comparing unit 154 also deletes the entry with the matching light emission pattern from the unacknowledged pattern list.

Before registering the node ID and the light-emitting position to the measured node list 143, the comparing unit 154 may convert the light-emitting position to the coordinates in a world coordinate system, and then register the information. For example, the comparing unit 154 converts the light-emitting position to the coordinates in the world coordinate system based on a conversion table defining a relation between a light-emitting position in the image information and the coordinates in the world coordinate system.

Figure 9:
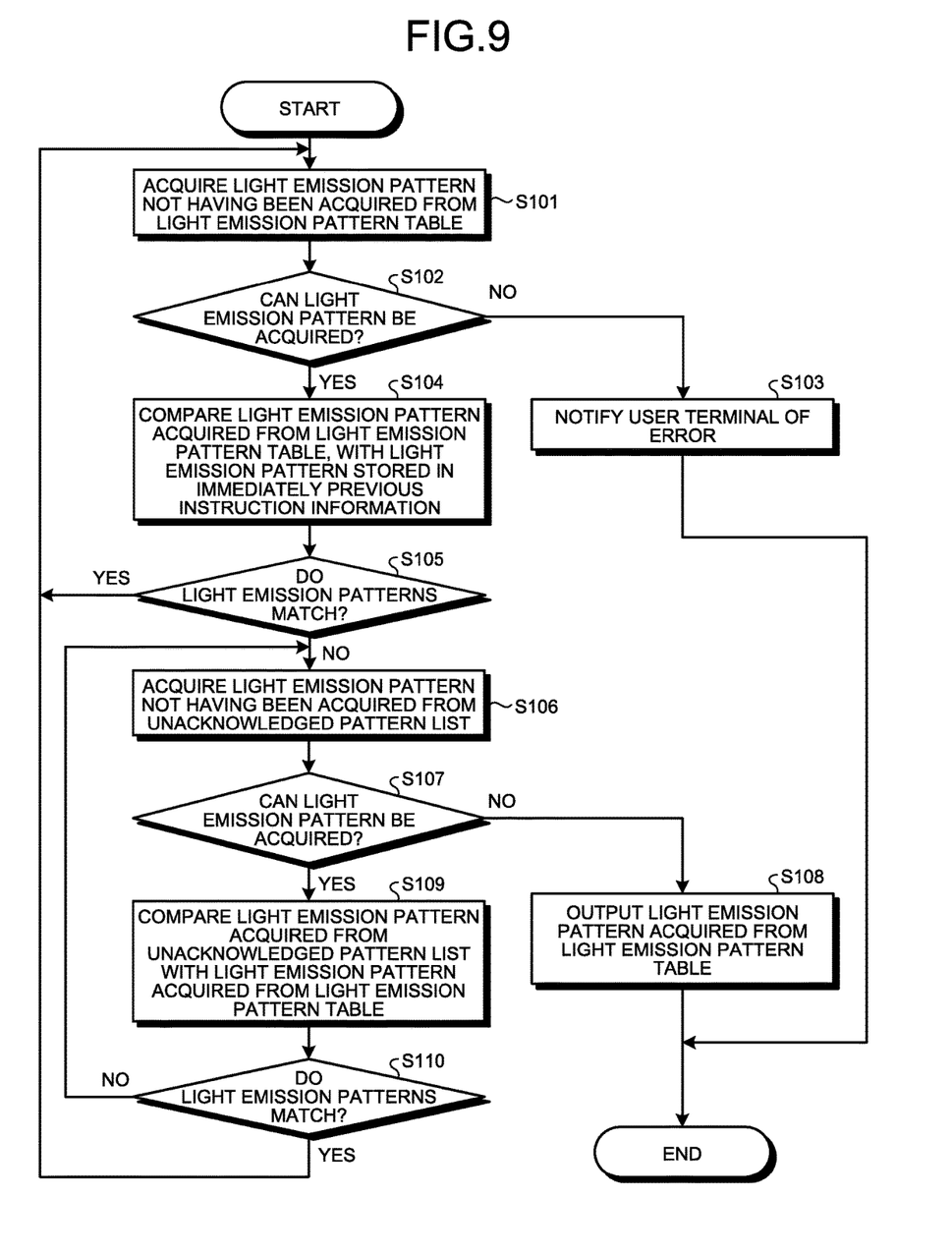
FIG. 9 is a flowchart illustrating the sequence of an exemplary process performed by a pattern generating unit.

The sequence of an exemplary process performed by the position measuring apparatus 100 according to the embodiment will now be explained. FIG. 9 is a flowchart illustrating the sequence of an exemplary process performed by the pattern generating unit. As illustrated in FIG. 9, the pattern generating unit 151 included in the position measuring apparatus 100 acquires a light emission pattern not having been acquired, from the light emission pattern table 145 (Step S101). If no light emission pattern can be acquired (No at Step S102), the pattern generating unit 151 notifies the user terminal of an error (Step S103).

If a light emission pattern can be acquired (Yes at Step S102), the pattern generating unit 151 compares the light emission pattern acquired from the light emission pattern table 145, with the light emission pattern stored in the immediately previous instruction information (Step S104). If the light emission pattern acquired from the light emission pattern table 145 matches the light emission pattern stored in the immediately previous instruction information (Yes at Step S105), the pattern generating unit 151 shifts the process to Step S101.

If the light emission pattern acquired from the light emission pattern table 145 does not match the light emission pattern stored in the immediately previous instruction information (No at Step S105), the pattern generating unit 151 shifts the process to Step S106.

The pattern generating unit 151 acquires a light emission pattern not having been acquired from the unacknowledged pattern list 142 (Step S106). If no light emission pattern can be acquired (No at Step S107), the pattern generating unit 151 outputs the light emission pattern acquired from the light emission pattern table 145 to the light emission control unit 152 (Step S108).

If a light emission pattern can be acquired (Yes at Step S107), the pattern generating unit 151 compares the light emission pattern acquired from the unacknowledged pattern list 142 with the light emission pattern acquired from the light emission pattern table 145 (Step S109). If the light emission pattern acquired from the unacknowledged pattern list 142 matches the light emission pattern acquired from the light emission pattern table 145 (Yes at Step S110), the pattern generating unit 151 shifts the process to Step S101.

If the light emission pattern acquired from the unacknowledged pattern list 142 does not match the light emission pattern acquired from the light emission pattern table 145 (No at Step S110), the pattern generating unit 151 shifts the process to Step S106.

Figure 10:
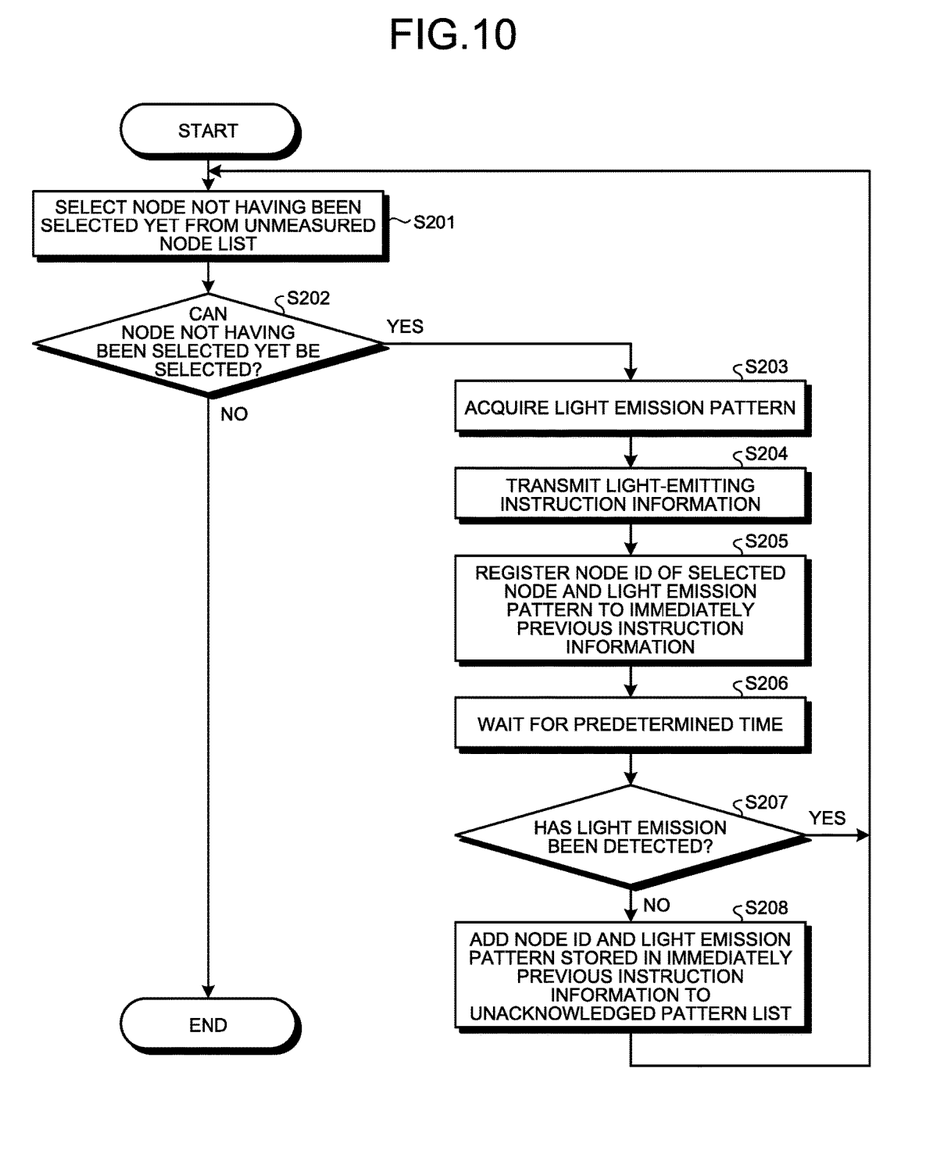
FIG. 10 is a flowchart illustrating the sequence of an exemplary process performed by a light emission control unit.

FIG. 10 is a flowchart illustrating the sequence of an exemplary process performed by the light emission control unit. As illustrated in FIG. 10, the light emission control unit 152 in the position measuring apparatus 100 selects a node not having been selected yet from the unmeasured node list 144 (Step S201). If no node not having been selected yet can be selected (No at Step S202), the light emission control unit 152 ends the process.

If a node not having been selected yet can be selected (Yes at Step S202), the light emission control unit 152 acquires the light emission pattern from the pattern generating unit 151 (Step S203). The light emission control unit 152 then transmits light-emitting instruction information (Step S204).

The light emission control unit 152 registers the node ID of the selected node and the light emission pattern to the immediately previous instruction information 141 (Step S205). The light emission control unit 152 then waits for a predetermined time (Step S206). The light emission control unit 152 then determines whether a notification indicating that the light emission has been detected is acquired from the comparing unit 154 (Step S207).

If the notification indicating that the light emission has been detected is acquired from the comparing unit 154 (Yes at Step S207), the light emission control unit 152 shifts the process to Step S201. If the notification indicating that the light emission has been detected is not acquired from the comparing unit 154 (No at Step S207), the light emission control unit 152 adds the node ID and the light emission pattern stored in the immediately previous instruction information 141 to the unacknowledged pattern list 142 (Step S208), and shifts the process to Step S201. For example, the light emission control unit 152 deletes the node ID and the light emission pattern stored in the immediately previous instruction information 141, subsequently to the execution of Step S208.

Figure 11:
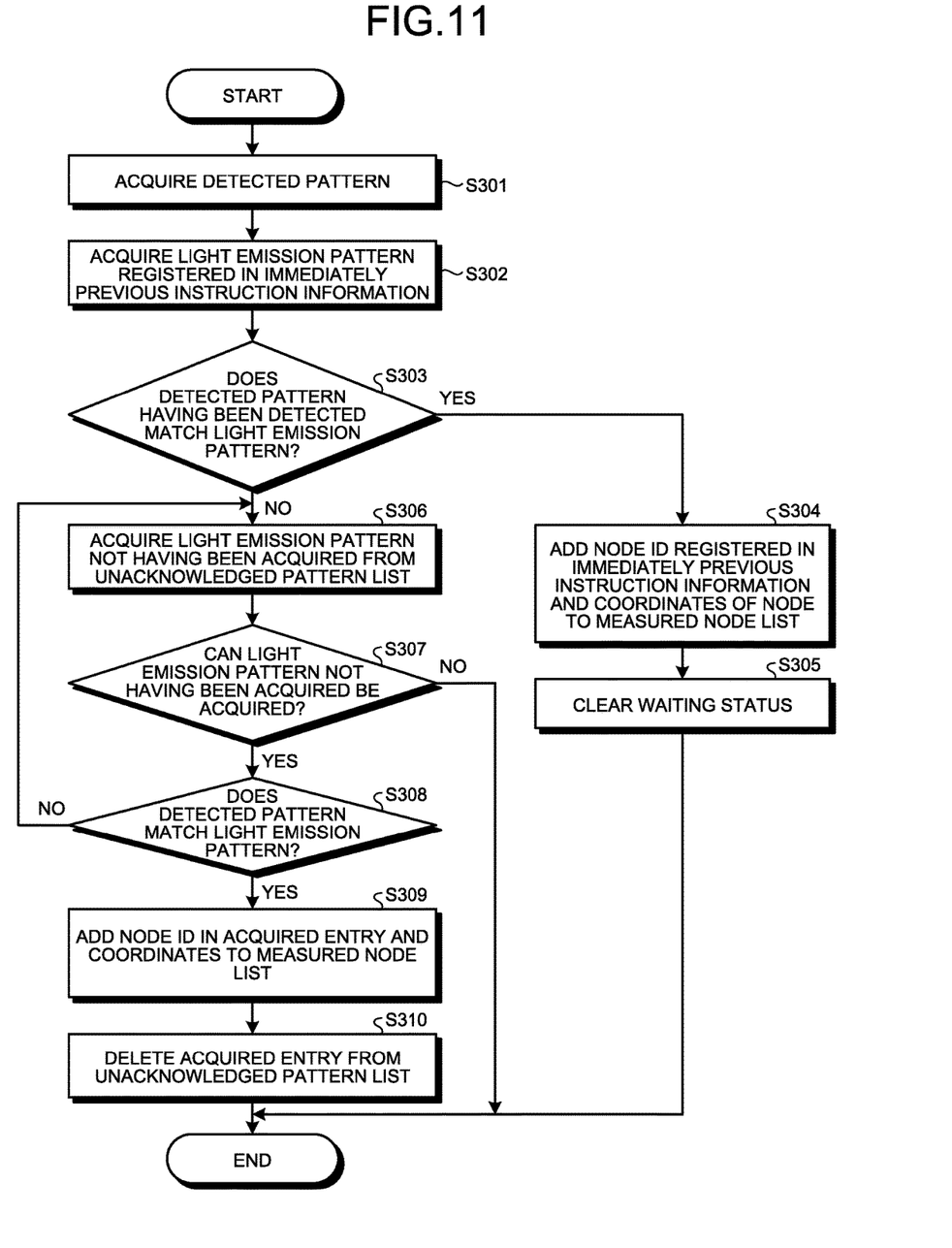
FIG. 11 is a flowchart illustrating the sequence of an exemplary process performed by a comparing unit.

FIG. 11 is a flowchart illustrating the sequence of an exemplary process performed by the comparing unit. As illustrated in FIG. 11, the comparing unit 154 in the position measuring apparatus 100 acquires a detected pattern from the image analyzing unit 153 (Step S301). The comparing unit 154 then acquires the light emission pattern registered in the immediately previous instruction information 141 (Step S302).

If the detected pattern having been detected matches the light emission pattern (Yes at Step S303), the comparing unit 154 shifts the process to Step S304. The comparing unit 154 then adds the node ID registered in the immediately previous instruction information 141 and the coordinates of the node to the measured node list 143 (Step S304). The comparing unit 154 then notifies the light emission control unit 152 of the acknowledgement of the light emission, and clears the waiting status (Step S305).

If the detected pattern having been detected does not match the light emission pattern (No at Step S303), the comparing unit 154 shifts the process to Step S306. The comparing unit 154 then acquires a light emission pattern not having been acquired from the unacknowledged pattern list 142 (Step S306). If no light emission pattern not having been acquired can be acquired (No at Step S307), the comparing unit 154 ends the process.

If a light emission pattern not having been acquired can be acquired (Yes at Step S307), the comparing unit 154 determines whether the detected pattern matches the light emission pattern (Step S308). If the detected pattern does not match the light emission pattern (No at Step S308), the comparing unit 154 shifts the process to Step S306.

If the detected pattern matches the light emission pattern (Yes at Step S308), the comparing unit 154 adds the node ID in the acquired entry and the coordinates of the node to the measured node list 143 (Step S309). The comparing unit 154 deletes the acquired entry from the unacknowledged pattern list 142 (Step S310).

Figure 12:
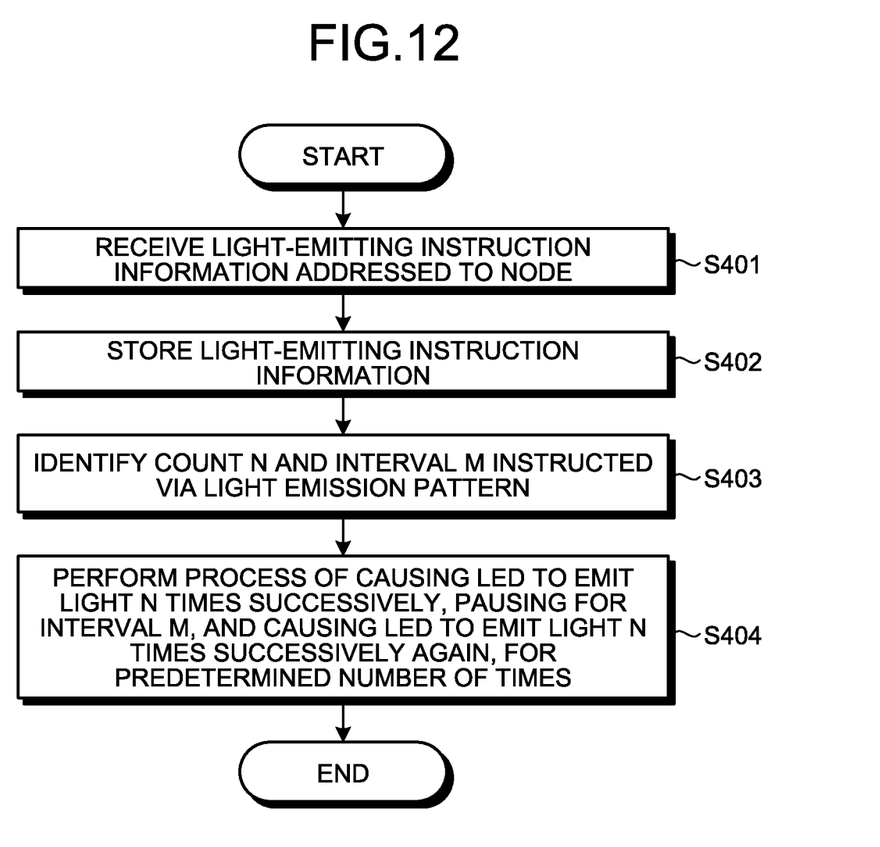
FIG. 12 is a flowchart illustrating the sequence of an exemplary process performed by a node.

The sequence of an exemplary process performed by the node 10 according to the embodiment will now be explained. FIG. 12 is a flowchart illustrating the sequence of an exemplary process performed by the node. As illustrated in FIG. 12, the communicating unit 12 included in the node 10 receives light-emitting instruction information addressed to that node (Step S401), and stores the light-emitting instruction information (Step S402).

The light emitting unit 13 in the node 10 identifies the count N and the interval M instructed via the light emission pattern (Step S403). The light emitting unit 13 performs a process of causing the LED to emit light N times successively, pausing for the interval M, and causing the LED to emit light N times successively again, for a predetermined number of times (Step S404).

The effects achieved by the position measuring apparatus 100 according to the embodiment will now be explained. The position measuring apparatus 100 instructs a node 10 to emit light in some light emission pattern. If the light emission pattern cannot be acknowledged, the position measuring apparatus 100 gives an instruction for the light emission using a light emission pattern that is different from the previous one. Therefore, even if the timing of light emission arrives earlier or later than expected due to the effect of the multi-hopping communication, the node having emitted the light and the light-emitting position can be mapped to each other. Therefore, it is possible to measure the position of the node.

Because the position measuring apparatus 100 uses a simple light emission pattern, such as a light-emission count and a light-emission interval, as the light emission pattern to be instructed to the node 10, light emission patterns can be distinguished from one another even by using an LED.

Once a light emission pattern instructed to a node 10 has been acknowledged, the position measuring apparatus 100 re-uses the light emission pattern having been acknowledged to give a light-emitting instruction to another node of which position is to be measured. In this manner, it is possible to keep the number of light emission patterns less than the number of nodes, and the number of bits which identify the nodes can be reduced. Therefore, the time required in measuring the position can also be reduced.

Figure 13:
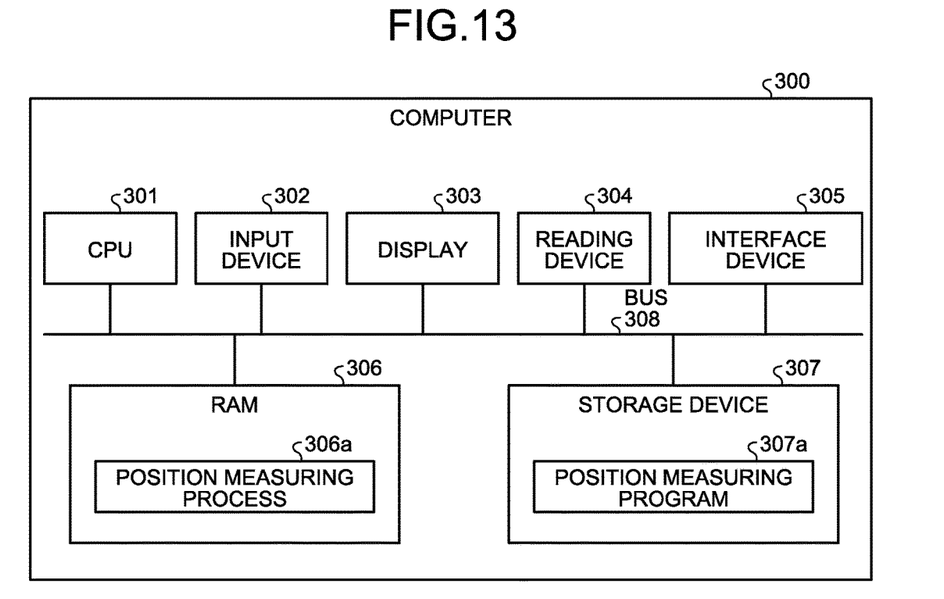
FIG. 13 is a schematic illustrating an example of a hardware configuration of a computer executing a position measuring program.

An exemplary computer executing a position measuring program for implementing the same functions as those provided by the position measuring apparatus 100 described in the embodiment will now be explained. FIG. 13 is a schematic illustrating an exemplary computer executing the position measuring program. This computer 300 also corresponds to a hardware configuration diagram of the position measuring apparatus 100.

As illustrated in FIG. 13, the computer 300 includes a central processing unit (CPU) 301 that executes various operations, an input device 302 that receives inputs of data from a user, and a display 303. The computer 300 also includes a reading device 304 that reads computer programs and the like from a storage medium, and an interface device 305 that transmits and receives data to and from another computer over a network. The computer 300 includes a random access memory (RAM) 306 temporarily storing therein various types of information, and a storage device 307. The devices 301 to 307 are then connected to a bus 308.

The storage device 307 includes a position measuring program 307a, for example. The CPU 301 reads the position measuring program 307a and loads the position measuring program 307a onto the RAM 306. The position measuring program 307a functions as a position measuring process 306a. For example, the process of the position measuring process 306a corresponds to the process performed by the control unit 150.

The position measuring program 307a does not necessarily need to be stored in the storage device 307 from the beginning. For example, the position measuring program 307a may be stored in a "portable physical medium", such as a flexible disk (FD), a compact disc read-only memory (CD-ROM), a digital versatile disc (DVD), a magneto-optical disc, and an integrated circuit (IC) card, to be inserted to the computer 300, and the computer 300 may read the position measuring program 307a from the portable physical medium and execute the position measuring program 307a.

Figure 14:
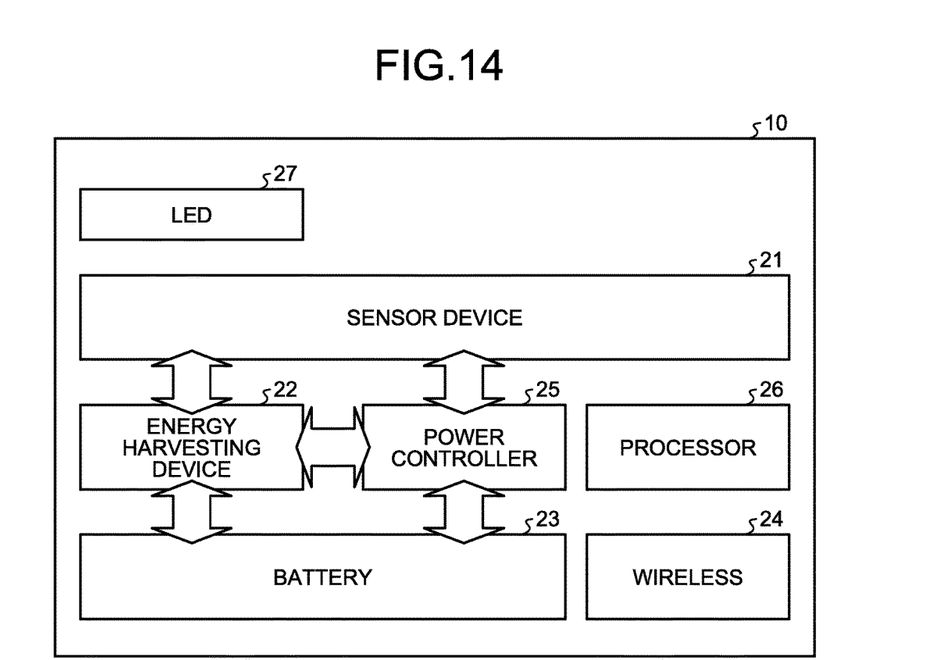
FIG. 14 is a schematic illustrating a hardware configuration of the node.

An exemplary hardware configuration of the node 10 will now be explained. FIG. 14 is a schematic illustrating a hardware configuration of the node. For example, the node 10 includes a sensor device 21, an energy harvesting device 22, a battery 23, a wireless 24, a power controller 25, a processor 26, and an LED 27.

The sensor device 21 is a sensor that measures the environment information. The energy harvesting device 22 is a device that generates weak power using environmental radio waves or temperature. The battery 23 is a battery storing therein the power generated by the energy harvesting device 22. The wireless 24 is a device that communicates data with other nodes. The power controller 25 is a device that performs power management of the node 10. The processor 26 is a device that performs the process corresponding to the light emitting unit 13 illustrated in FIG. 2.

The position of a node can be measured.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A position measuring apparatus comprising:
a memory; and
a processor that executes a process comprising:
first instructing a first node included in a plurality of nodes to emit light by transmitting a first light emission pattern to the first node;
storing information on a position at which the light emission is detected and information on the first node in the memory in a manner mapped to each other, when light emission following the instructed first light emission pattern is detected;
second instructing a second node that is different from the first node to emit light by transmitting the first light emission pattern to the second node, when light emission following the instructed first light emission pattern is detected; and
third instructing the second node to emit light by transmitting a second light emission pattern that is different from the first light emission pattern, when light emission following the instructed first light emission pattern is not detected.

2. The position measuring apparatus according to claim 1, wherein the third instructing instructs the second node to emit light by transmitting the second light emission pattern when light emission following the instructed first light emission pattern is not detected within a predetermined time.

3. The position measuring apparatus according to claim 1, the process further comprising storing information on the first node and the first light emission pattern in the memory, when light emission following the first light emission pattern instructed to the first node is not detected within a predetermined time, wherein the third instructing transmits the second light emission pattern to the second node, and the second light emission pattern does not match any light emission pattern stored in the memory.

4. The position measuring apparatus according to claim 3, wherein when the first instructing has instructed the first node to emit light by transmitting the first light emission pattern to the first node and then detects different light emission pattern that is different from the instructed first light emission pattern, the first instructing deletes a light emission pattern which matches the different light emission pattern stored in the memory.

5. A method of position measuring comprising:
first instructing a first node included in a plurality of nodes to emit light by transmitting a first light emission pattern to the first node, using a processor;
storing information on a position at which the light emission is detected and information on the first node in the memory in a manner mapped to each other, when light emission following the instructed first light emission pattern is detected, using the processor;
second instructing a second node that is different from the first node to emit light by transmitting the first light emission pattern to the second node, when light emission following the instructed first light emission pattern is detected, using the processor; and
third instructing the second node to emit light by transmitting a second light emission pattern that is different from the first light emission pattern, when light emission following the instructed first light emission pattern is not detected, using the processor.

6. A non-transitory computer readable recording medium having stored therein a program that causes a computer to execute a process comprising:
first instructing a first node included in a plurality of nodes to emit light by transmitting a first light emission pattern to the first node;
storing information on a position at which the light emission is detected and information on the first node in a memory in a manner mapped to each other, when light emission following the instructed first light emission pattern is detected;
second instructing a second node that is different from the first node to emit light by transmitting the first light emission pattern to the second node, when light emission following the instructed first light emission pattern is detected; and
third instructing the second node to emit light by transmitting a second light emission pattern that is different from the first light emission pattern, when light emission following the instructed first light emission pattern is not detected.

* * * * *